United States Patent [19]

Bond et al.

[11] 4,390,898
[45] Jun. 28, 1983

[54] SCRAMBLING AND UNSCRAMBLING VIDEO SIGNALS IN A PAY TV SYSTEM

[75] Inventors: John A. Bond; Yuan-Lu Li, both of Ottawa; Leslie J. Crane, Nepean, all of Canada

[73] Assignee: Northern Telecom Limited, Montreal, Canada

[21] Appl. No.: 246,878

[22] Filed: Mar. 23, 1981

[51] Int. Cl.³ .............................................. H04N 7/16
[52] U.S. Cl. .................................... 358/119; 358/120; 358/123
[58] Field of Search ............... 358/119, 120, 122, 123

[56] References Cited

U.S. PATENT DOCUMENTS

| | | | |
|---|---|---|---|
| 2,972,008 | 2/1961 | Ridenour et al. | 358/123 |
| 3,184,537 | 5/1965 | Court et al. | 178/5.1 |
| 3,313,880 | 4/1967 | Bass | 178/5.1 |
| 3,813,482 | 5/1974 | Blonder | 178/5.1 |
| 4,081,832 | 3/1978 | Sherman | 358/124 |
| 4,163,254 | 7/1979 | Block et al. | 358/122 |
| 4,266,243 | 5/1981 | Shutterly | 358/120 |
| 4,333,107 | 6/1982 | McGuire | 358/122 |
| 4,338,628 | 7/1982 | Payne et al. | 358/122 |

OTHER PUBLICATIONS

NASA Tech Brief, vol. 3, No. 1, MSC-16843, Spring 1978.

*Primary Examiner*—S. C. Buczinski
*Attorney, Agent, or Firm*—R. Haley Haley

[57] ABSTRACT

A scrambler scrambles a video signal by replacing its vertical intervals with dummy video signal lines, and separately providing information relating to the timing of the replaced vertical intervals. This information is encoded using an encryption key and is distributed with the scrambled video signal by modulation of the horizontal sync. pulses of the scrambled video signal. An unscrambler derives the information from the horizontal sync. pulses, which it regenerates, and decodes the information and uses it to generate a vertical interval of correct timing to replace the dummy lines of the scrambled video signal, thereby producing an unscrambled video signal reproducible on a conventional TV receiver. The scrambling is further enhanced by varying the number of dummy lines which are used to replace different vertical intervals, thereby producing a video signal of variable field length, which is not susceptible of recording.

16 Claims, 9 Drawing Figures

SCRAMBLING AND UNSCRAMBLING VIDEO SIGNALS IN A PAY TV SYSTEM

This invention relates to subscription television (pay TV) systems, and is particularly concerned with a method of and apparatus for scrambling and unscrambling video signals for use in such systems.

It is known in the art of pay TV systems to scramble a video signal before broadcasting it, with the intent that only authorized persons, equipped with an appropriate unscrambler, should be able to unscramble the video signal for viewing on a conventional television receiver, in return for payment of a fee. The video signal may be scrambled in a variety of ways, with or without simultaneous scrambling of the accompanying audio signal. For example, Court et al. U.S. Pat. No. 3,184,537, issued May 18, 1965 discloses a pay TV system in which video signal scrambling is effected by suppressing to a constant grey level horizontal and vertical synchronizing (sync) signals and blanking intervals, unscrambling being enabled by composite sync pulses which are modulated upon the normal audio carrier. Bass U.S. Pat. No. 3,313,880 discloses a pay TV system in which the nature of the ordinary sync signals is changed, and additional signals having the nature of the ordinary sync signals but having a different timing are transmitted as part of the video signal to produce unsynchronized operation of television receivers not equipped with unscramblers. Blonder U.S. Pat. No. 3,813,482 issued May 28, 1974 discloses a pay TV system in which scrambling of the video signal is effected by alternately depressing and not depressing to blanking level, at a rate of about 10 Hz, the vertical sync signals to produce a shifting, rolling picture on an unauthorized television receiver, a keying signal for unscrambling the video signal at an authorized receiver being modulated on the audio carrier.

Such known pay TV systems have the disadvantage that the security of the system exists entirely in the scrambling scheme. In other words, anyone acquiring or making an appropriate unscrambler can unscramble the scrambled signal(s) without payment of any fee. In order to provide a more secure pay TV system, which makes it more difficult to unscramble the scrambled signal(s) without payment of fees, it is known to supply a code periodically and separately from the broadcast video signal to authorized subscribers of the pay TV system, which code must be compared with a code broadcast with the scrambled video signal in order to enable unscrambling. For example the separately supplied code can be supplied monthly to each authorized subscriber by mail in a system as described in Sherman U.S. Pat. No. 4,081,832 issued Mar. 28, 1978 or via a non-dedicated telephone line in a system as described in Block et al. U.S. Pat. No. 4,163,254 issued July 31, 1979. The security of such systems exists partly in the coding scheme and partly in the scrambling scheme.

As disclosed in a co-pending application Ser. No. 251,085 by Y. J. Aminetzah filed on Apr. 6, 1981 and entitled "Method of Controlling Scrambling and Unscrambling in a Pay TV System", the entire disclosure of which is hereby incorporated herein by reference, the coding scheme used in a pay TV system can be made highly secure, so that it is difficult or impossible for unauthorized persons to gain access within a reasonable time to a proper code to effect unscrambling of the scrambled signal(s) in the normal manner. However, the use of such a highly secure coding scheme does not alone assure the security of the pay TV system. On the contrary, the highly structured nature and information redundancy in the scrambled signal(s) of the known scrambling schemes discussed above makes it possible for unauthorized persons to effect unscrambling directly from the scrambled signal(s), by-passing any coding scheme which may be used. In this respect, it is observed that in the known scrambling schemes there is a high correlation from line to line and from field to field in the scrambled video signal, which correlation may be utilized to facilitate unscrambling by unauthorized persons.

Accordingly, a need exists to provide a more secure video signal scrambling scheme, which is less susceptible to direct unscrambling and which can be used in conjunction with a secure coding scheme to facilitate provision of a secure pay TV system. An object of this invention is to provide a method of and apparatus for scrambling a video signal in a pay TV system by means of which this need may be fulfilled. Further objects are to provide a method of and apparatus for unscrambling the scrambled video signal, and to provide a pay TV system embodying such scrambling and unscrambling apparatus.

According to one aspect this invention provides a method of scrambling a video signal, comprising video signal lines and vertical intervals, to produce a scrambled video signal, said method comprising replacing each vertical interval by dummy video signal lines and separately providing information relating to the timing of the replaced vertical intervals of the scrambled video signal, wherein different numbers of dummy video signal lines are used to replace different vertical intervals, whereby the field length of the scrambled video signal is varied.

Thus the conventional vertical synchronizing information of the video signal is completely replaced, in the scrambled video signal, by dummy video signal lines which are indistinguishable by a conventional television receiver from the normal video signal lines of the video signal. In consequence, without unscrambling, a television receiver supplied with the scrambled video signal would produce a vertically unsynchronized and unwatchable picture.

The separately provided information conveniently indicates the start of each replaced vertical interval, and is conveniently provided as part of the scrambled video signal. Preferably the information is modulated onto horizontal line synchronizing information forming a part of each video signal line. In this case the scrambled video signal reproduced on a conventional television receiver without unscrambling is not only vertically unsynchronized but also largely horizontally unsynchronized, making it even more unwatchable.

In order to provide further security to a pay TV system using this method of scrambling, the information is preferably encoded in accordance with an encryption key, which can be recurrently changed and provided only to authorized subscribers of the pay TV system to enable proper unscrambling of the scrambled video signal.

The use of different numbers of dummy video signal lines to replace different vertical intervals inhibits unauthorized unscrambling of the scrambled video signal by persons using a known form of vertical interval generator to synchronize a conventional television receiver to receive the scrambled video signal. The scrambled video signal consequently has a non-standard and variable field length, rendering unauthorized unscrambling in this manner ineffective in vertically synchronizing the resultant picture. A further advantage provided in this respect is that the video signal, even after proper, authorized, unscrambling, has a variable field length which inhibits proper operation of a video signal recorder which may be used to try to record the video signal for subsequent use or duplication.

According to another aspect, the invention provides a method of scrambling a video signal, comprising video signal lines and vertical intervals, to produce a scrambled video signal which comprises said video signal lines and dummy video signal lines in place of said vertical intervals, said method comprising the steps of: storing the video signal lines of the video signal to be scrambled sequentially in a memory and reading them sequentially from the memory to constitute the video signal lines of the scrambled video signal; re-reading video signal lines from the memory to produce said dummy video signal lines of the scrambled video signal, different numbers of video signal lines being re-read from the memory to produce dummy video signal lines to replace different vertical intervals, whereby the field length of the scrambled video signal is varied; and separately providing information relating to the timing of the replaced vertical intervals.

In accordance with another aspect of the invention, there is provided apparatus for scrambling a video signal, comprising video signal lines and vertical intervals, to produce a scrambled video signal, said apparatus comprising: a memory unit; means for storing the video signal lines sequentially in the memory unit; means for providing an indication of the timing of each vertical interval relative to the video signal lines stored in the memory unit; means for reading the video signal lines sequentially from the memory unit, the reading means being responsive to said indication to re-read video signal lines from the memory unit to produce dummy video signal lines in place of each vertical interval, the reading means re-reading different numbers of video signal lines to replace different vertical intervals; said video signal lines sequentially read from the memory unit and said dummy video signal lines constituting the scrambled video signal; and means for providing information relating to the timing of each replaced vertical interval of the scrambled video signal.

The apparatus preferably includes means for selectively removing horizontal line synchronizing pulses from the video signal lines of the scrambled video signal in dependence upon said information.

According to yet another aspect, the invention provides a subscription television system comprising: a scrambling apparatus comprising means for replacing each vertical interval of a video signal, comprising video signal lines and vertical intervals, by a plurality of dummy video signal lines to produce a scrambled video signal, different vertical intervals being replaced by different numbers of dummy video signal lines whereby the scrambled video signal has a variable field length, and means for providing information relating to the timing of each replaced vertical interval of the scrambled video signal; means for distributing said scrambled video signal and said information to at least one unscrambling apparatus; and at least one said unscrambling apparatus comprising means responsive to said information for generating vertical intervals each having a timing coincident with the timing of said dummy video signal lines of the scrambled video signal, and means for replacing said dummy video signal lines of the scrambled video signal by said vertical intervals to produce an unscrambled video signal.

Preferably, said scrambling apparatus comprises means for modulating horizontal line synchronizing pulses of the video signal lines of the scrambled video signal with said information, whereby the distributing means distributes said information as part of the scrambled video signal with which it is supplied, and said unscrambling apparatus comprises means for deriving said information from the horizontal line synchronizing pulses of the video signal lines of the scrambled video signal and for regenerating said horizontal line synchronizing pulses.

The invention will be further understood from the following description with reference to the accompanying drawings, in which.

Figure 1:
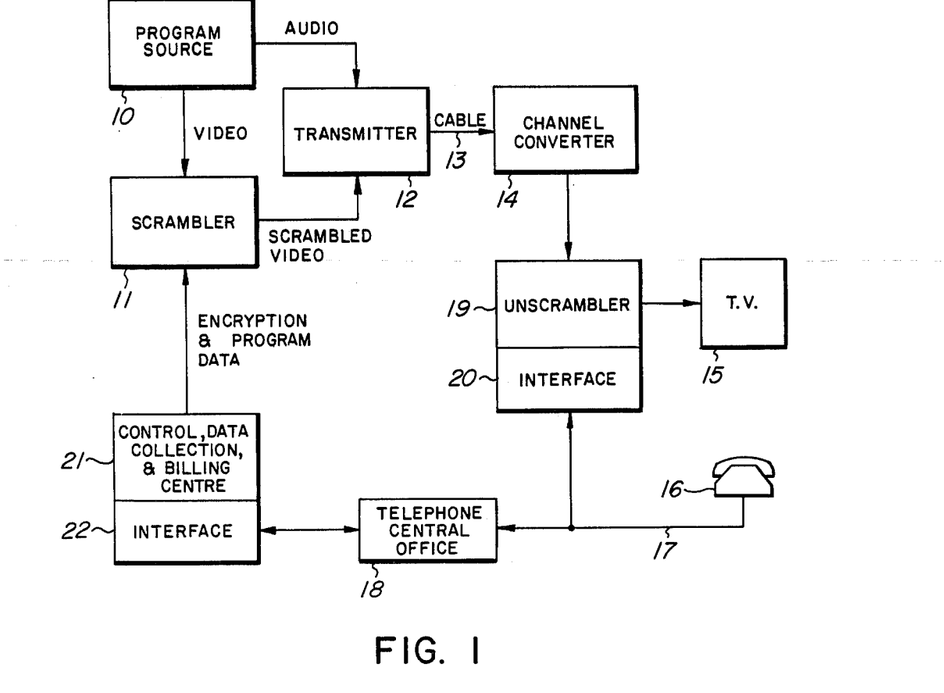
FIG. 1 illustrates a pay TV system including a scrambler and an unscrambler which operate in accordance with this invention.

Referring to FIG. 1, there is shown therein parts of a pay TV system in which video signals from a program source 10 are scrambled in a scrambler 11, the resultant scrambled video signals and audio signals from the program source being supplied to a transmitter 12 for broadcasting to subscribers of the pay TV system. As shown, the audio signals are not scrambled, but they could also be scrambled in known manner if desired. The audio signal path from the program source 10 to the transmitter 12 may also include a delay unit, (not shown), for example providing a signal delay of 30 ms, (the duration of one television field), to keep the timing of the transmitted audio signals matched to the average timing of the scrambled video signals. The broadcast signals are illustratively supplied to a subscriber's home via a cable 13, but they could alternatively be supplied by electromagnetic radiation, directly or via a satellite link.

The subscriber's home includes a conventional channel converter 14, television receiver 15, and telephone 16, the latter being connected via a conventional telephone line 17 to a telephone central office 18. An unscrambler 19 is coupled between the output of the channel converter 14 and the input of the television receiver 15, and is also coupled via an interface circuit 20 to the telephone line 17. The interface circuit 20 is preferably of the type described in a co-pending patent application Ser. No. 247,229, filed on Mar. 25, 1981 by T. H. Murto and S. D. Alvey, entitled "Interface Circuits for Connection to Non-Dedicated Telephone Lines", the entire disclosure of which is hereby incorporated herein by reference.

The pay TV system also includes a control, data collection, and billing centre 21, which can be located at the program source 10, scrambler 11, and transmitter 12, or at the telephone central office 18, or separately from both. In any event the centre 21 is coupled via an appropriate interface 22 to the telephone central office 18 for communicating recurrently with each unscrambler 19 via the relevant telephone line 17, and is coupled, either permanently or when required via a telephone or data transmission line, to the scrambler 11 for supplying encryption and program data thereto. As an alternative, the program data may instead originate in the program source 10, and be supplied from there to both the scrambler 11 and the centre 21.

The centre 21 recurrently, for example monthly, supplies encryption and program data to the scrambler 11, which scrambles the video signals supplied to it in the manner described below and in dependence upon the encryption data, and also inserts the program data into the scrambled video signals. In order to enable each authorized unscrambler 19 to unscramble the scrambled signals when desired, the centre 21 periodically supplies thereto, via the interfaces 22 and 20 and via the telephone central office 18, a code (monthly code) which in conjunction with a device code individual to the subscriber enables proper operation of the unscrambler. This coding scheme is described fully in the co-pending application by Y. T. Aminetzah already referred to, to which reference is directed in this respect.

Figure 2:
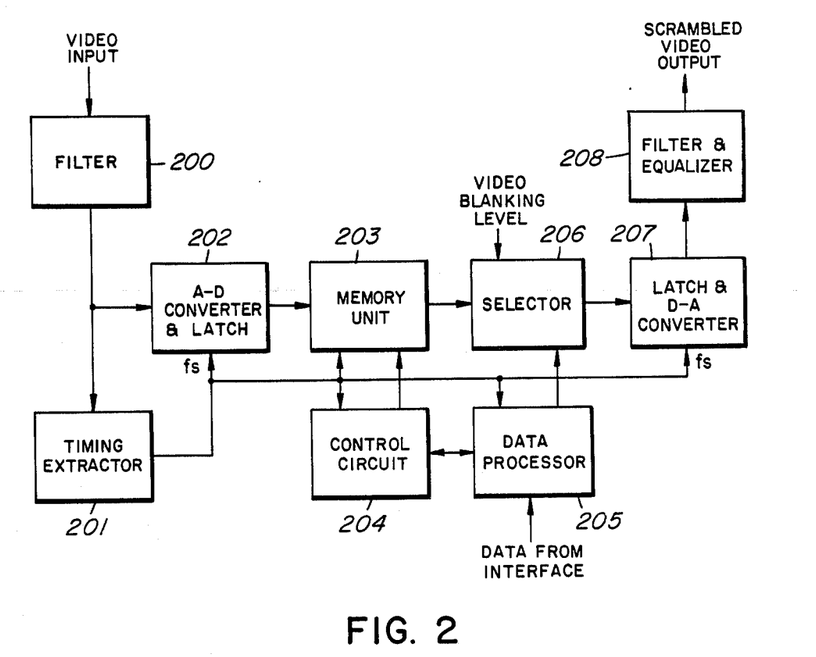
FIG. 2 shows a block diagram of the scrambler which includes a timing extractor, a memory unit, a control circuit, and a data processor.

FIG. 2 shows a block diagram of the scrambler 11. The video input signal from the program source 10 is conducted via a 4.2 MHz low-pass anti-aliasing filter 200 to a timing extractor 201 and to the input of an analog-digital (A-D) converter and latch 202. The A-D converter samples the analog video signal at a frequency fs, supplied by the timing extractor 201, and equal to four times the video signal color subcarrier frequency fb, and linearly converts each sample into an 8-bit digital value which is stored in the latch. This gives 910 digital samples per horizontal line for an NTSC video signal for which the color subcarrier frequency fb is 3.579545 MHz. These digital samples are written into, and subsequently read from, a memory unit 203 under the control of a control circuit 204 and a data processor 205. A selector 206 is controlled by the processor 205 to supply either the digital samples read from the memory unit 203 or a digital video blanking level to a latch and digital-analog converter 207, which operates at the frequency fs to latch the digital values supplied thereto and to convert them into an analog video signal. This analog video signal is filtered and equalized in a 4.2 MHz low-pass filter and a (sin x)/x equalizer, shown as a single block 208, whose output constitutes the scrambled video output signal. The timing extractor 201 supplies various timing signals to the units 203, 204, and 205, as well as the signal fs to the units 202 and 207. The data processor 205 is supplied with the encryption and program data from an interface (not shown) which is coupled to the centre 21.

Figure 3:
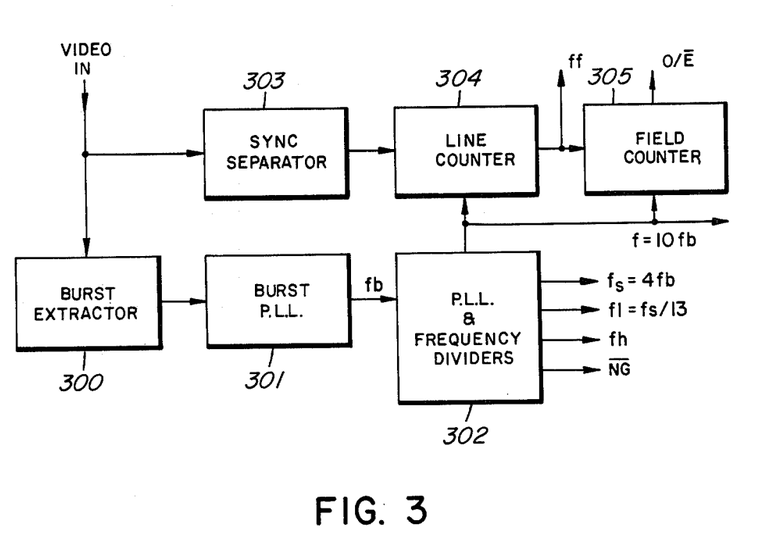
FIG. 3 shows a block diagram of the timing extractor.
Figure 4:
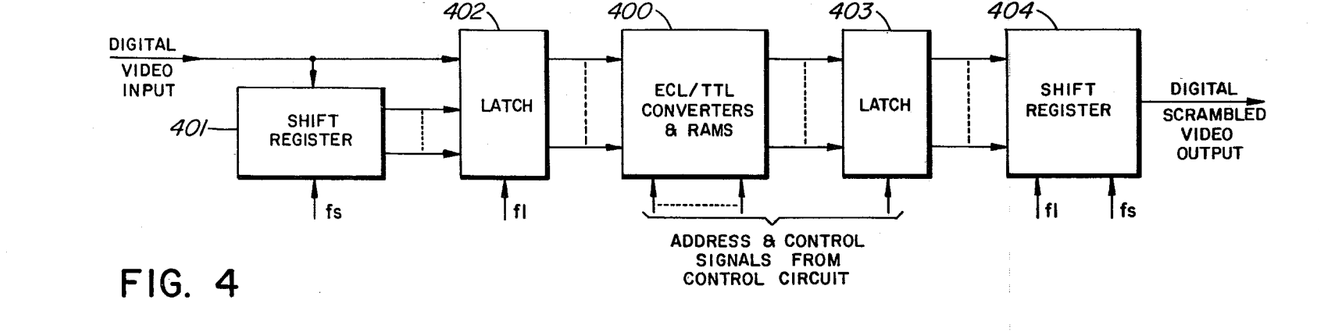
FIG. 4 shows a block diagram of the memory unit.

The timing extractor 201 is shown in greater detail in FIG. 3. A color burst extractor 300 extracts the color burst from each horizontal line of the incoming video signal and supplies it to a color burst phase locked loop (PLL) 301, which regenerates the color burst frequency fb. This is supplied to a further PLL including an oscillator having a frequency 40 fb, whose output is frequency divided to produce the various frequency signals indicated in FIG. 3 and described below. This further PLL and the frequency dividers are shown as a single block 302. The incoming video signal is also supplied to a sync separator 303, which derives the composite sync signals from the video signal and triggers a line counter 304 to count the horizontal lines of each field. The output signal ff of the line counter 304, which is a logic 0 during each vertical interval, is frequency-divided by two in a field counter 305 to produce a signal $O/\overline{E}$ which changes state each field, and whose state thus corresponds to the phase of the color burst of the incoming video signal. The counters 304 and 305 are synchronized by a signal f produced in the block 302 and having ten times the color subcarrier frequency fb. The block 302 also produces the signal fs=4 fb already described, a signal fl having a frequency which is one-thirteenth the frequency fs, a signal fh having the horizontal line frequency, and a signal NG also having the horizontal line frequency and which is a logic 0 during each horizontal line sync pulse of the video signal. Thus the various timing signals have the following frequencies:

f = 35.79544 MHz
fs = 14.31818 MHz
fl = 1.1014 MHz
fh = $\overline{NG}$ = 15.734 kHz
ff = 59.94 Hz
$O/\overline{E}$ = 29.97 Hz FIG. 4 illustrates the memory unit 203 in greater detail. This unit comprises 104 TTL 64 kbit RAMs (random access memories), together with associated ECL to TTL and TTL to ECL converters, shown as a single block 400. The RAMS are cyclically controlled and addressed, by address and control signals supplied by the control unit 204, for write-in and read-out of the digital video signal. In view of the relatively slow speed of each memory access cycle, the digital video signal is written into and read from the RAMs 13 8-bit words at a time, 1 bit of each word being written into or read from a respective one of the 104 RAMS. Accordingly, the 8-bit video signal words from the A-D converter and latch 202 are shifted into a shift register 401 under the control of the signal fs, and the words are transferred 13 at a time to a latch 402 under the control of the signal fl, to be written into the RAMs. Conversely, the 8-bit words are read out from the RAMs and stored in an output latch 403 13 at a time under the control of the control circuit 204, and are loaded in parallel from the latch 403 into a shift register 404 under the control of the signal fs to constitute the digital scrambled video output of the memory unit 203. The number of 13 words written into and read from the RAMs is selected in view of the speed of the RAMs and the number of 910 samples per horizontal line of the video signal, to provide a convenient number of 70 memory access cycles each horizontal line.

Figure 5:
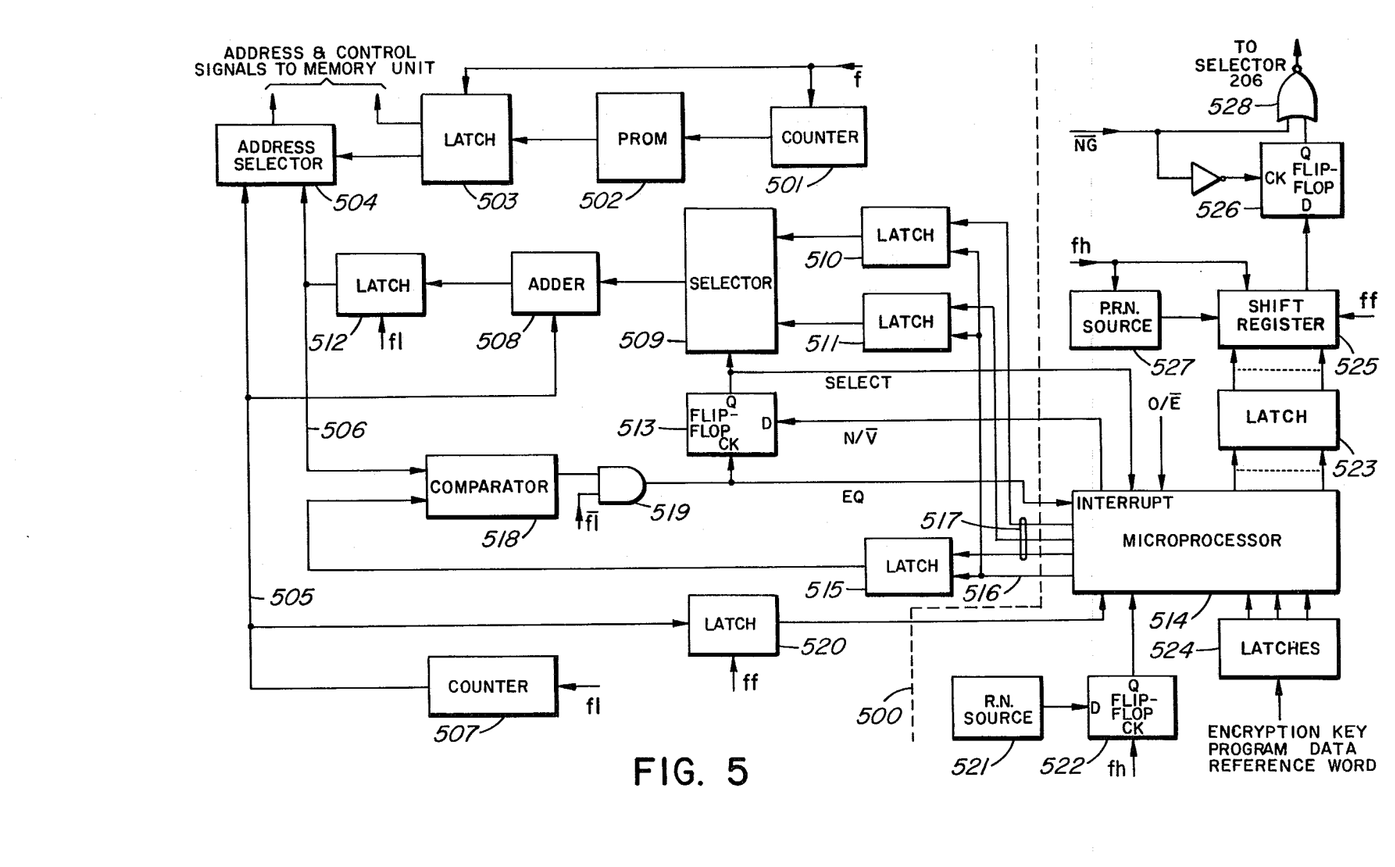
FIG. 5 shows a block diagram of the control circuit and the data processor.

The control circuit 204 is shown to the left, and the data processor 205 is shown to the right, of a broken line 500 in FIG. 5. The control circuit 204 includes a modulo-65 counter 501, a PROM 502, and a latch 503 for producing control signals and selecting address signals, by means of an address selector 504, for each memory access cycle. The counter 501 is clocked by the signal f to increment its count, and for each count the PROM 502 is addressed to produce a set of control signals which are latched in the latch 503 under the control of the signal f. The control signals in the latch 503 control the cyclical operation of the RAMs (block 400) and latch 403 of the memory unit and the selection of a write address from a bus 505 or a read address from a bus 506 for supply to the RAMs.

The write address on the bus 505 is produced by a 16-bit synchronous counter 507 which is clocked by the signal fl, so that the incoming video signal words are written cyclically into successive memory locations. The read address on the bus 506 is produced by adding to the current write address, in a modulo $2^{16}$ adder 508, an offset which is selected by a selector 509 from a latch 510 or a latch 511, and latching the sum in a latch 512 under the control of the signal fl. The selector 509 is controlled by a signal 'SELECT' produced at the Q output of a D-type flip-flop 513, which signal is also supplied to a microprocessor 514 in the data processor 205. The microprocessor 514 supplies the offsets to the latches 510 and 511, and supplies a read address to a latch 515, via a common bus 516 under the control of respective latch loading signals on lines 517. The microprocessor also supplies a signal $N/\overline{V}$ to the data input D of the flip-flop 513. A comparator 518 compares the read address on the bus 506 with the read address stored in the latch 515 and, when the compared addresses are the same, produces an output signal which is gated with the signal $\overline{fl}$ in an AND gate 519 to produce a signal EQ which is supplied to the clock input CK of the flip-flop 513 and as an interrupt signal to the microprocessor 514. The microprocessor 514 is also supplied with a vertical interval start address from a latch 520; this is the write address on the bus 505 which exists at the start of a vertical interval of the video signal and which is latched in the latch 520 under the control of the signal ff.

The components 507 to 520 of the control circuit 204 and the data processor 205 operate as follows. As already explained, the incoming video signal words are written cyclically into the memory, and the start address of each vertical interval is stored in the latch 520. Reading from the memory of the video signal words of picture lines (i.e. lines not in the vertical interval) takes place sequentially after a delay, or offset, which is determined by the contents of the latch 510. Accordingly, during such reading, with the signals EQ=0, $N/\overline{V}=0$, and SELECT=1, the selector 509 is controlled to supply the offset from the latch 510 to the adder 508, where this offset is added to the write address to produce the read address. The offset is stored in the latch 510 by the microprocessor 514 as described below, and is an integral multiple of 70 so that video signal lines are read from the memory a whole number of line periods after being written into the memory.

The microprocessor 514 also stores a different offset, again an integral multiple of 70, in the latch 511, and stores the vertical interval start address, obtained from the latch 520, in the latch 515. Accordingly, with continued reading from the memory, the comparator 518 eventually detects equality of the read address and the address in the latch 515, in response to which the signal EQ becomes 1 and then again becomes 0 with the next falling edge of the signal fl supplied to the gate 519. This 1-to-0 transition of the signal EQ triggers the flip-flop 513 via its clock input CK, to transfer the logic level of the signal $N/\overline{V}$ at its D input to its Q output, so that the singal SELECT becomes 0, and also constitutes an interrupt to the microprocessor 514. In response to the interrupt, the microprocessor 514 reads the state of the signal SELECT, supplies a new address to the latch 515, and sets the signal $N/\overline{V}$ to 1 (opposite to the new state of the signal SELECT). The new address which is latched in the latch 515 is different from the current read address, which is now offset from the write address by the offset contained in the latch 511 which with the signal SELECT=0 is selected by the selector 509. The comparator 518 no longer detects equality and the signal EQ remains 0.

The offset stored in the latch 511 is selected so that now picture signal lines from another part of the memory are read out instead of the vertical interval signals. The address which is stored in the latch 515 is selected in relation to this offset so that this reading of picture signal lines instead of vertical interval signals continues for a total of approximately 21 lines, i.e. for approximately the duration of the vertical interval. At the end of this period the comparator 518 again detects equality of addresses as described below. For example, in a particularly simple situation the offset stored in the latch 511 may be equivalent to 21 picture lines less than the offset stored in the latch 510. In this situation the address stored in the latch 515 can remain unchanged in response to the interrupt to the microprocessor 514. On the read address reaching the vertical interval start address after reading of a field of picture lines, the selector 509 is controlled to cause the last 21 lines of the field to be re-read instead of the following vertical interval signals. When the vertical interval start address is again reached, the selector 509 is controlled to cause the picture lines of the next field to be read, as described below.

On the comparator 518 again detecting equality after approximately 21 lines, as before the flip-flop 513 is triggered to change the signal SELECT back to 1, so that the read address again becomes offset from the write address by the contents of the latch 510, and the microprocessor 514 is again interrupted to read the signal SELECT, set the signal $N/\overline{V}$ to 0, and to update the contents of the latches as further described below.

It should be appreciated from the above description that the vertical interval signals of each field of the incoming video signal are replaced by repeated, dummy, picture lines to produce the scrambled video signal. The lines which are repeated may be constant, for example they may be the last lines of the previous field as described above, but are preferably varied recurrently, e.g. for successive fields, in order to make unauthorized descrambling of the scrambled video signal more difficult. The dummy picture lines are selected to have the same phase of the color subcarrier reference burst as the vertical interval lines which they replace, to which end the microprocessor 514 is also supplied with the signal $O/\overline{E}$.

In order to scramble the video signal further, the microprocessor 514 produces offsets and addresses to vary the number of dummy lines which are read out from the memory in place of each 21-line vertical interval. Thus instead of 21 dummy lines, for example 17, 19, 23 or 25 dummy lines can be read out from the memory in place of a vertical interval of 21 lines, thereby shortening or lengthening the video signal field by 2 or 4 lines. Progressive changes in the field length of the scrambled video signal achieved in this manner, within the limits imposed by the size of the memory and whilst maintaining a long-term average of 21 dummy lines per vertical interval, has the effect of producing a continuously and variably rolling picture on a television receiver which is supplied with a video signal which is derived by direct, unauthorized, unscrambling of the scrambled video signal. In order to provide such progressive changes, the data processor 205 includes a random noise source 521 and a flip-flop 522. A random noise signal, such as the noise voltage of a diode or resistor constituting the source 521, is clocked by the signal fh to the Q output of the flip-flop 522, and this output is read by the microprocessor 514 to determine the direction of change of the read address relative to the write address of the memory, the various offsets and addresses being calculated accordingly.

In order to avoid objectionable picture jitter due to the changing field length on television receivers equipped with authorized unscramblers as described below, the microprocessor 514 is arranged to change the field length of the scrambled video signal relatively slowly. It has been found that changing the length of one frame (two fields) by two lines, with at least two frames between such changes, results in a subjectively negligible picture jitter.

Figure 6:
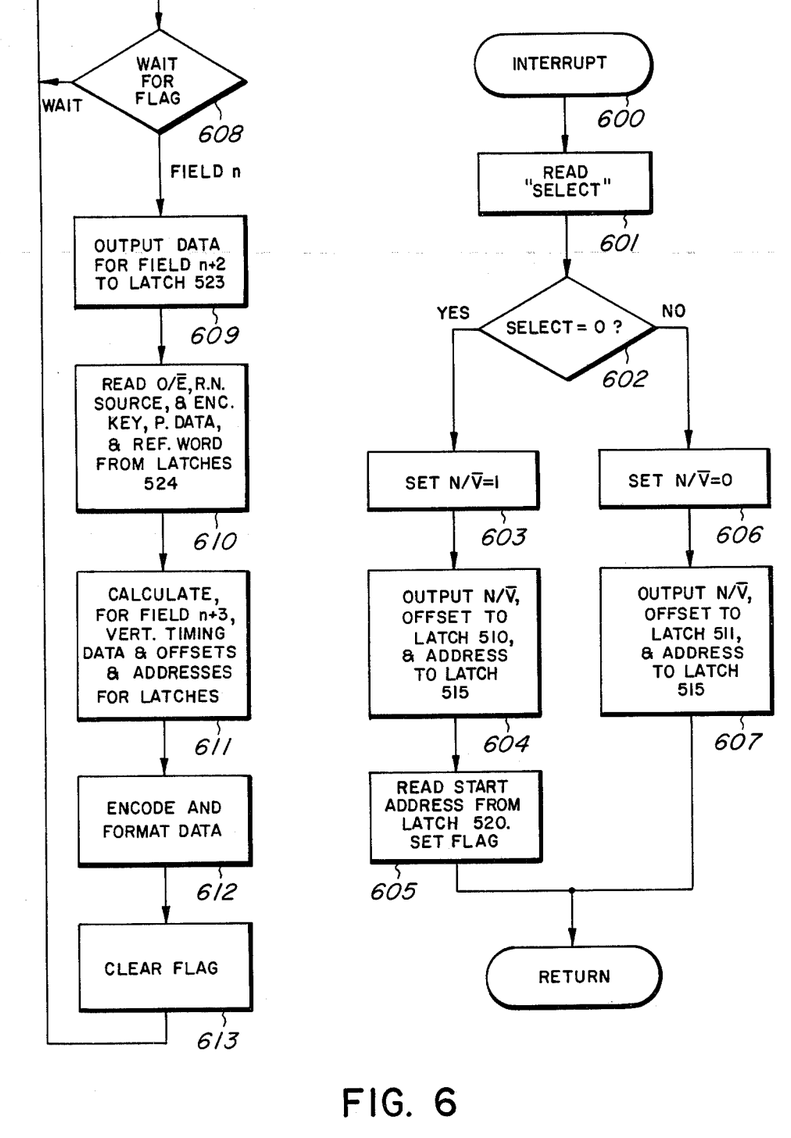
FIG. 6 is a flow chart illustrating the operation of the data processor.

FIG. 6 shows a flow chart illustrating the operation of the microprocessor 514. As shown, in response to an interrupt 600, the microprocessor reads the signal SELECT (block 601) and determines whether this signal is 0 (block 602). The signal SELECT=0 indicates that the interrupt occurred at the start of a vertical interval, during which the offset for reading from the memory is obtained from the latch 511. In this case the microprocessor sets the signal N/$\overline{\text{V}}$ to 1 at block 602, and at block 604 outputs this value, a previously calculated offset for reading from the memory for the next field into the latch 510, and an appropriate address to the latch 515. Then at block 605 the microprocessor reads the vertical interval start address from the latch 520, and sets a flag. Conversely, the signal SELECT=1 determined at block 602 indicates that the interrupt occurred at the end of reading dummy picture lines which replaced a vertical interval, and that reading of normal picture lines with the offset from the latch 510 is now taking place. In this case at block 606 the signal N/$\overline{\text{V}}$ is set to 0, and at block 607 the microprocessor outputs this value, a previously calculated offset for reading dummy picture lines during the next vertical interval into the latch 511, and the previously read vertical interval start address into the latch 515.

The microprocessor waits at block 608 for the flag to be set in response to the interrupt at the start of each vertical interval, i.e. for each field n. Then at a block 609 it outputs data, as described below, to a latch 523. This data relates to the field n+2; i.e. it is output to the latch 523 two fields early. Then at block 610 the microprocessor reads the signal O/$\overline{\text{E}}$, the signal from the random noise source 521 as produced at the Q output of the flip-flop 522, and reads from latches 524 the encryption key and program data already referred to and a reference word described below. From this information the microprocessor calculates at block 611, for the field n+3, vertical timing data constituting a part of the data to be supplied to the latch 523, and appropriate offsets and addresses to be loaded into the latches 510, 511, and 515 in due course. The microprocessor then, at block 612, encodes and formats the data for the field n+3 to be output to the latch 523 in the following field, and clears the flag at block 613.

In order to enable authorized unscramblers to determine the start of each field of the scrambled video signal, the microprocessor 514 calculates the vertical timing data referred to above, encodes it using the encryption key, and combines this data with the reference word for synchronizing purposes, with the program data, and with check bits. This combined data is output to the latch 523, as already described above, for each field of the incoming video signal. This data must be transmitted to the subscriber stations of the pay TV system, and there are numerous known ways in which this can be done (for example, modulation onto the audio carrier or onto another carrier, supersonic signalling tones added to the audio signal, or tone signals inserted into the composite video signal). In this embodiment of the invention, the data is transmitted by modulation of the horizontal synchronizing pulses of the scrambled video signal. In other words, a horizontal synchronizing pulse is either transmitted in normal form, or replaced by the blanking level, in dependence upon each bit of data to be transmitted. This provides a data transmission rate of 15734 bits/s, which is ample for the required data transmission. An added advantage of this form of data transmission is that it further scrambles the scrambled video signal by producing horizontal tearing of the picture. This form of data transmission is the subject of a copending patent application by J. A. Bond filed concurrently herewith and entitled "Transmission of Data with a Video Signal", the entire disclosure of which is hereby incorporated herein by reference.

Accordingly, the data in the latch 523 is parallel-loaded at the start of each field, under the control of the signal ff, into a shift register 525, through which it is shifted serially under the control of the signal fh and via a flip-flop 526 under the control of the signal $\overline{\text{NG}}$ to produce a control signal, having one bit per horizontal line of the video signal, at the Q output of the flip-flop 526. In each field the data is followed by a noise signal from a pseudo-random noise source 527 to provide a continuous data stream which ensures horizontal tearing throughout a picture reproduced from the video signal. The control signal is gated with the signal $\overline{\text{NG}}$ in a NOR gate 528 whose output controls the selector 206 to select either the relevant horizontal sync. pulse read out from the memory unit 203 or a digital video blanking level, depending on the relevant data bit. Only the horizontal sync. pulses are modulated in this manner; the rest of each video signal line, including the color burst, is read out from the memory unit 203 via the selector 206 as already described.

Figure 7:
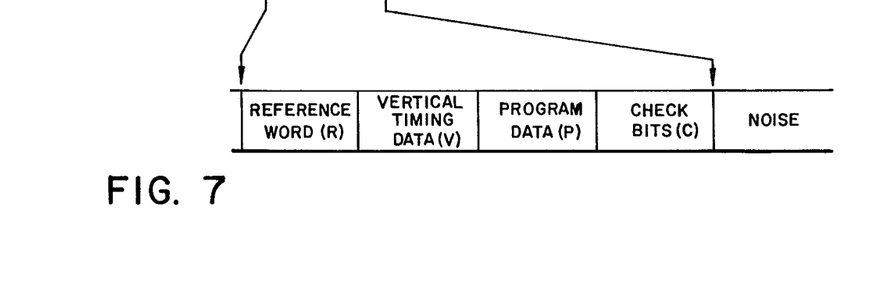
FIG. 7, which is on the same sheet as FIG. 4, is a timing diagram illustrating the format of data which is transmitted with the scrambled video signal.

FIG. 7 illustrates the format of this data in relation to the timing of the incoming and scrambled video signals. As shown, the scrambled video signal fields (including dummy picture lines) follow the incoming video signal fields (including the normal vertical intervals) after an arbitrary delay D which can vary from one field to the next due to the variable field length already described. The data which is latched in the latch 523 comprises the reference word R, vertical timing data V, the program data P, and check bits C. As shown in FIG. 7, this data is transmitted synchronously with the incoming video signal. Thus during the incoming video field n, the data R, V (for the second following field n+2), P and C are transmitted, together with noise from the noise source 527. However, this data is a synchronous to the scrambled video signal, due to the variable delay D, and accordingly can not be used for direct unauthorized unscrambling of the scrambled video signal.

The reference word R is for example a predetermined 32-bit word, which serves for synchronizing purposes and is repeated every field. The vertical timing data V is a count of the number of half-lines of the scrambled video signal between the start of the relevant field and the end of the preceding reference word R. For example FIG. 7 shows that the data V transmitted during the incoming video field n is the count of the number of half-lines from the end of the reference word R which is transmitted during the incoming video field n+2 to the start of the scrambled video field n+2. This data V is securely encrypted by the microprocessor 514, using the encryption key read from the latches 524, before being supplied to the latch 523. For example the transmitted data V comprises 9 bits. The program data P can be optionally encoded or not, and for example comprises 8 bits which indicate the nature of the scrambled program and/or the relevant billing rate for unscrambling this program for viewing. The check bits comprise for example a four-bit single-error correction, double-error detection code which serve for checking the data R, V, and P in the same field. As already described, the remaining bits of each field are noise. Although not illustrated, the microprocessor 514 provides additional bits in the data latched in the latch 523 periodically, for example every 9 bits, to ensure that at least one horizontal sync pulse is transmitted every 9 video signal lines, this being required for recovery of the horizontal sync pulses in the unscrambler 19 as described below.

Figure 8:
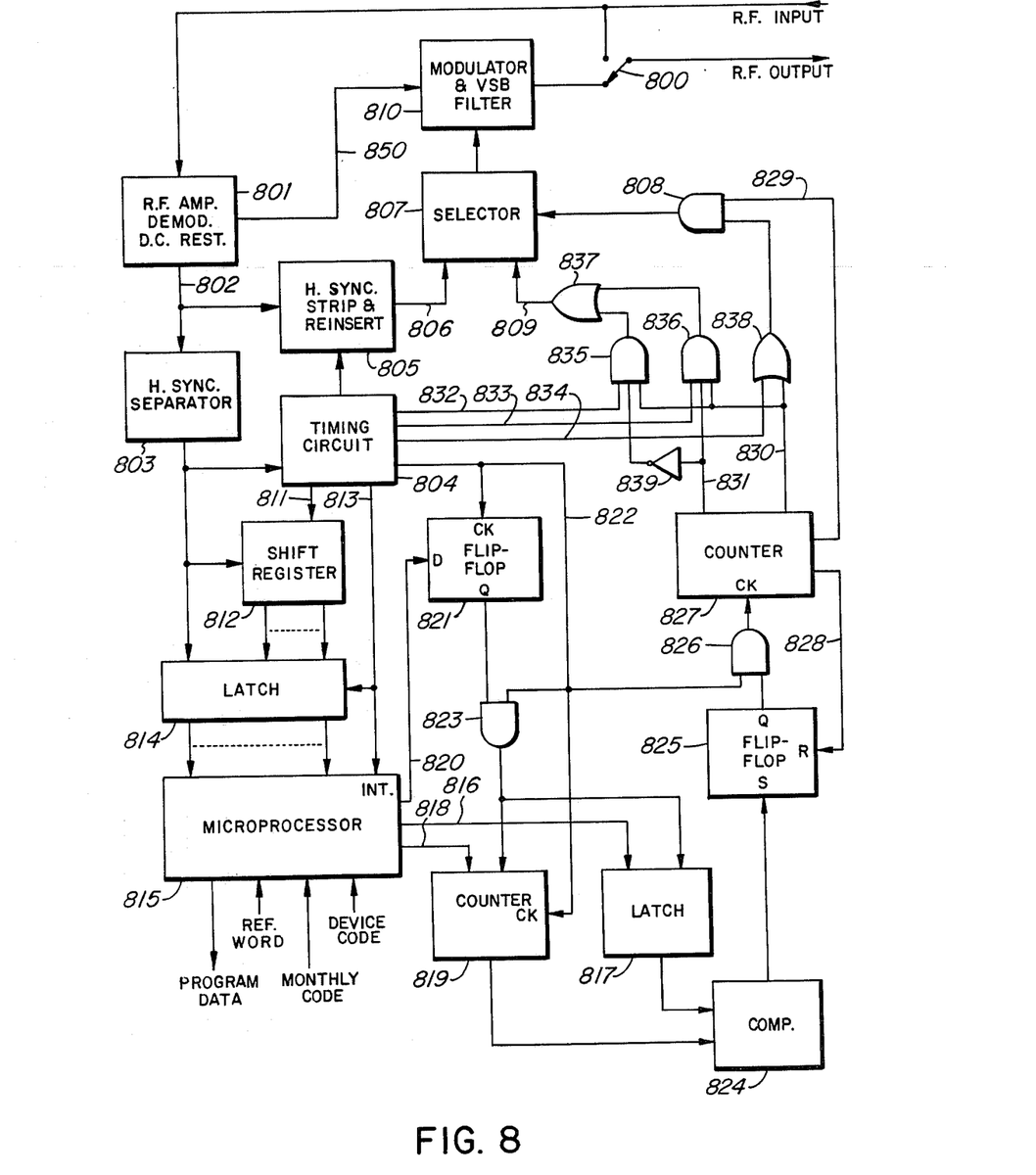
FIG. 8 shows a block diagram of the unscrambler.

FIG. 8 illustrates the unscrambler 19, which includes a switch 800 for selectively connecting an r.f. input of the unscrambler to its r.f. output for bypassing the unscrambler for reception of normal television signals. For unscrambling scrambled video signals the switch 800 has the position shown, and the r.f. input is conducted to an r.f. amplifier, demodulator, and d.c. restoration unit 801 to produce the baseband scrambled video signal on a line 802. The horizontal sync pulses which are present in the scrambled video signal and comprise the data stream are separated by a horizontal sync separator 803 and are applied to a timing circuit 804, which includes a flywheel circuit to regenerate the horizontal sync pulse for each video signal line. A horizontal sync pulse stripper and reinserter 805 is supplied with the regenerated sync pulses and with the scrambled video signal from the line 802, from which it removes the horizontal sync pulses which are present and to which it adds the regenerated sync pulses to produce on a line 806 a scrambled video signal having proper horizontal synchronizing signals. A selector 807 is controlled by the output of an AND gate 808 to connect either the scrambled video signal on the line 806 or a line 809 to an r.f. modulator and vestigial sideband filter unit 810, the output of which is an unscrambled r.f. television signal which is supplied to the r.f. output via the switch 800. Demodulated audio signals are supplied directly from the unit 801 to the unit 810 via a line 850.

The timing circuit 804 produces a signal one a line 811 during each regenerated horizontal sync pulse to shift the bits of the data stream from the separator 803 into a shift register 812, and produces a signal on a line 813 every 16 video signal lines to load this data into a latch 814 and to interrupt a microprocessor 815. In response to each interrupt the microprocessor inputs the data from the latch 814. The microprocessor 815 is separately supplied, for example from a store not shown, with the predetermined reference word, and compares the data cumulatively received from the latch 814 to determine for each field the time of the end of each reference word R and the data V and P, which it checks using the check bits C. The microprocessor outputs the program data P, after decoding if necessary, to be stored and accessed in due course for billing purposes, via the telephone line 17 as described with reference to FIG. 1. Having located the program data P in each field, the microprocessor decodes this using the monthly code, which is supplied to the unscrambler 19 recurrently via the telephone line as already described, and the device code which is stored in the unscrambler itself. In view of the transmission of the encoded data V in advance of the field to which it relates, as already described, the microprocessor has the duration of one field to effect the necessary decoding.

Having decoded the vertical timing data V, which is a count of the number of half lines from the end of a reference word R to the start of the next vertical interval, the microprocessor 815 decrements this by one to produce on a bus 816 a value to be loaded into a latch 817, and calculates and produces on a bus 818 an initial count to be loaded into a counter and produces in response to the next interrupt a logic 1 on a line 820. This logic 1 is clocked through a D flip-flop 821 under the control of a clock signal produced on a line 822 by the timing circuit 804 and having a frequency of twice the horizontal line frequency of the video signal. The Q output of the flip-flop 821 is gated with the clock signal on the line 822 in an AND gate 823 to produce a load signal which is supplied to the latch 817 to load the value on the bus 816 therein and to the counter 819 to load the initial count on the bus 818 therein. The count of the counter 819, which is incremented by the clock signal on the line 822 being supplied to a clock input CK of the counter, is compared with the contents of the latch 817 by a comparator 824, which produces an output signal when the count of the counter 819 equals the value latched in the latch 817. The initial count, which the microprocessor 815 calculates and which is loaded into the counter 819, is calculated in relation to the determined timing of the end of the received reference word R and the timing of the interrupts via the line 813 so that this comparsion equality occurs immediately before the first dummy picture line of the scrambled video signal, corresponding to the start of a vertical interval of the original video signal prior to scrambling.

The output signal of the comparator 824 sets an RS flip-flop 825 via its setting input S. The Q output of this flip-flop consequently becomes a logic 1 to enable an AND gate 826 to supply the clock signal on the line 822 to a clock input CK of a modulo-42 counter 827. After counting 42 pulses of the clock signal, corresponding to a period equal to the duration of 21 video signal lines (the normal vertical interval duration), the counter 827 produces on an output line 828 a signal which resets the flip-flop 825 via its resetting input R, thereby inhibiting further counting by the counter 827 until the next equality detected by the comparator 824.

During its counting, the counter 827 produces a logic 1 on an output line 829 for all 21 video signal lines, a logic 1 on an output line 830 for only the first 9 video signal lines, and a logic 0 on an output line 831 for only the fourth, fifth, and sixth lines. The timing circuit 804 continuously produces standard serration and equalization pulses on lines 832 and 833 respectively, and on a line 834 a signal which is a logic 0 only during the horizontal sync pulse and color burst period of each video signal line. These signals are combined as illustrated by a gating circuit comprising the AND gate 808, AND gates 835 and 836, OR gates 837 and 838, and an inverter 839 to produce the control signal for the selector 807 at the output of the gate 808, and the desired pulses and blanking levels on the line 809 to constitute the normal signals of a vertical interval.

More particularly, the counter 827, gating circuit, and selector 807 thus operate to replace the dummy picture lines, which have been used to replace the vertical interval in the scrambling process, by a locally generated standard vertical interval comprising 21 video lines of which the first three comprise equalization pulses supplied from the line 833, the second three comprise serration pulses from the line 832, the third three comprise equalization pulses from the line 833, and the remaining 12 comprise the reinserted horizontal sync signals and the color burst signals of the dummy picture lines from the line 806, together with a blanking signal from the line 809.

Due to the variable field length provided by the scrambling process, and the standard 21-line vertical interval counted by the counter 827, the unscrambled video signal may contain one dummy picture line or may omit one normal picture line following the end of the vertical interval of a field (or more than one line if the field length is changed by more than one line at a time). Due to the overscanning of a normal television receiver by considerably more than one line, such extra or deleted lines in the unscrambled video signal will normally be unnoticed. However, if desired the extra and deleted lines could be avoided by using the microprocessor 815 to control the counting modulus of the counter 827, to match the length of each field.

Figure 9:
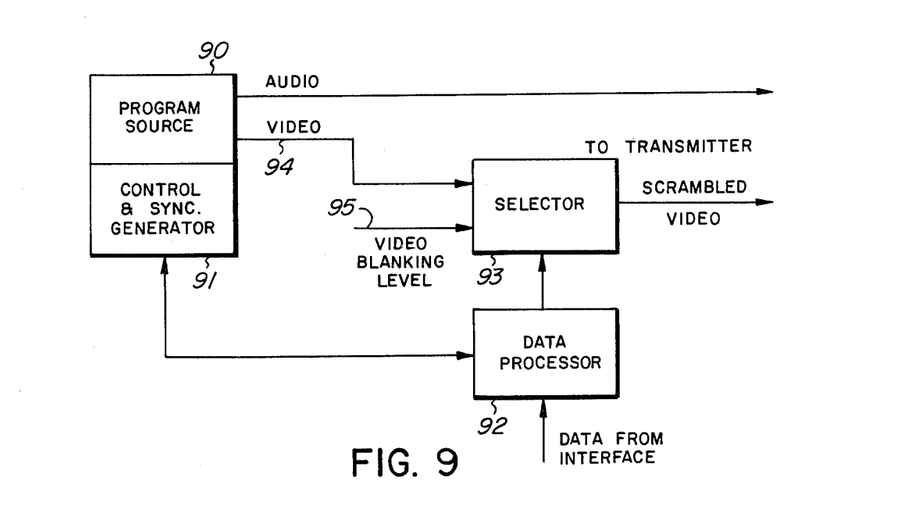
FIG. 9, which is on the same sheet as FIG. 1, shows a block diagram of a simplified form of scrambler specifically for use where the TV program source is at the same location as the scrambler.

FIG. 9 illustrates a modified and simplified form of the scrambling arrangement described above with reference to FIGS. 1 to 5, which can be used where a television program source 90, which includes a control and synchronizing pulse generator unit 91, is located at the same location as the scrambling equipment, which in this case comprises a data processor 92 and an analog signal selector 93. In this case the television picture image is continuously available from the program source 90, which for example comprises a studio television camera or a cine film, so that the memory unit 203 described above, and the associated conversion and latching circuitry, can be dispensed with.

Accordingly, in the arrangement of FIG. 9 the data processor 92 directly controls the unit 91 to provide the video signal on a line 94 with the described variable field length and replaced vertical intervals. This control is effected in real time by directly controlling a video line counter of the unit 91 to modify the field length and to effect additional scanning to provide video lines which replace the vertical intervals. Accordingly, the video signal on the line 94 is directly scrambled. In the same manner as described with reference to FIGS. 2 and 5, the processor 92 controls the selector 93 to select an analog video blanking level on a line 95, instead of the video signal on the line 94, to modulate the horizontal synchronizing pulses of the video signal with data relating to the scrambled signal.

The variable field length provided by the scrambling process described above has the result that the unscrambled signal also has a variable field length. An effect of this is that, while the unscrambled signal can be viewed on a television receiver without difficulty, the variable field length disrupts the operation of a video signal recorder which may be used to try to record the properly unscrambled video signal, for later use or duplication. Thus recording of the scrambled video signal even after it has been unscrambled by an authorized unscrambler, is inhibited. This feature is of distinct advantage in that it enables the proprietor of program material to retain control of the material even after it has been broadcast via the pay TV system.

It should be appreciated that this feature of a variable field length can be adopted, without any other scrambling of the video or audio signals, in an ordinary television broadcast where it is desired to inhibit recording of the broadcast program material on a video signal recorder. Thus a broadcaster can broadcast the program with normal synchronizing signals except that the vertical synchronizing signal is randomly jittered, in the manner described above, to inhibit recording whilst still permitting ordinary viewing of the broadcast on a conventional television receiver.

Although a particular embodiment of the invention has been described in detail, numerous changes, adaptations, and variations may be made thereto without departing from the scope of the invention, which is defined in the claims.

We claim:

1. A method of scrambling a video signal, comprising video signal lines and vertical intervals, to produce a scrambled video signal, said method comprising replacing each vertical interval by dummy video signal lines and separately providing information relating to the timing of the replaced vertical intervals of the scrambled video signal, wherein different numbers of dummy video signal lines are used to replace different vertical intervals, whereby the field length of the scrambled video signal is varied.

2. A method as claimed in claim 1 wherein said information indicates the start of each replaced vertical interval.

3. A method as claimed in claim 1 wherein said information is provided as part of the scrambled video signal.

4. A method as claimed in claim 1 wherein said information is modulated onto horizontal line synchronizing information forming a part of each video signal line.

5. A method as claimed in claim 4 wherein said information comprises a reference word and information which indicates the start of a subsequent replaced vertical interval relative to the end of the reference word.

6. A method as claimed in claim 1, 2, 3, 4, or 5 wherein said information is encoded in accordance with an encryption key.

7. A method of scrambling a video signal, comprising video signal lines and vertical intervals, to produce a scrambled video signal which comprises said video signal lines and dummy video signal lines in place of said vertical intervals, said method comprising the steps of:
   storing the video signal lines of the video signal to be scrambled sequentially in a memory and reading them sequentially from the memory to constitute the video signal lines of the scrambled video signal;
   re-reading video signal lines from the memory to produce said dummy video signal lines of the scrambled video signal, different numbers of video signal lines being re-read from the memory to produce dummy video signal lines to replace different vertical intervals, whereby the field length of the scrambled video signal is varied; and
   separately providing information relating to the timing of the replaced vertical intervals.

8. A method as claimed in claim 7 and including the step of modulating said information onto horizontal line synchronizing information forming a part of each video signal line.

9. A method as claimed in claim 7 wherein said information is binary information which is constituted by the presence or absence of a horizontal synchronizing pulse in each video signal line.

10. A method as claimed in claim 9 wherein said information comprises a reference word and information which indicates the start of a subsequent replaced vertical interval relative to the end of the reference word.

11. A method as claimed in claim 7 wherein each vertical interval has a duration corresponding to the duration of a predetermined number of video signal lines, and wherein selectively either this predetermined number, or this predetermined number increased or decreased by one, of video signal lines are re-read from the memory to constitute the dummy video signal lines to replace each vertical interval.

12. A method as claimed in claim 11 wherein the number of video signal lines which are re-read from the memory to constitute the dummy video signal lines to replace different vertical intervals is determined in dependence upon the output of a random noise source.

13. Apparatus for scrambling a video signal, comprising video signal lines and vertical intervals, to produce a scrambled video signal, said apparatus comprising:
a memory unit;
means for storing the video signal lines sequentially in the memory unit;
means for providing an indication of the timing of each vertical interval relative to the video signal lines stored in the memory unit;
means for reading the video signal lines sequentially from the memory unit, the reading means being responsive to said indication to re-read video signal lines from the memory unit to produce dummy video signal lines in place of each vertical interval, the reading means re-reading different numbers of video signal lines to replace different vertical intervals, said video signal lines sequentially read from the memory unit and said dummy video signal lines constituting the scrambled video signal; and
means for providing information relating to the timing of each replaced vertical interval of the scrambled video signal.

14. Apparatus as claimed in clim 13 and including means for selectively removing horizontal line synchronizing pulses from the video signal lines of the scrambled video signal in dependence upon said information.

15. A subscription television system comprising:
a scrambling apparatus comprising means for replacing each vertical interval of a video signal, comprising video signal lines and vertical intervals, by a plurality of dummy video signal lines to produce a scrambled video signal, different vertical intervals being replaced by different numbers of dummy video signal lines whereby the scrambled video signal has a variable field length, and means for providing information relating to the timing of each replaced vertical interval of the scrambled video signal;
means for distributing said scrambled video signal and said information to at least one unscrambling apparatus; and
at least one said unscrambling apparatus comprising means responsive to said information for generating vertical intervals each having a timing coincident with the timing of said dummy video signal lines of the scrambled video signal, and means for replacing said dummy video signal lines of the scrambled video signal by said vertical intervals to produce an unscrambled video signal.

16. A system as claimed in claim 15 wherein said scrambling apparatus comprises means for modulating horizontal line synchronizing pulses of the video signal lines of the scrambled video signal with said information, whereby the distributing means distributes said information as part of the scrambled video signal with which it is supplied, and said unscrambling apparatus comprises means for deriving said information from the horizontal line synchronizing pulses of the video signal line of the scrambled video signal and for regenerating said horizontal line synchronizing pulses.

* * * * *